(12) United States Patent
Glimpel et al.

(10) Patent No.: US 7,536,795 B2
(45) Date of Patent: May 26, 2009

(54) METHOD AND ARRANGEMENT FOR GAGING A THREAD PRODUCED IN AT LEAST TWO WORKING STEPS

(75) Inventors: Helmut Glimpel, Lauf (DE); Dietmar Hechtle, Pegnitz (DE)

(73) Assignee: EMUGE-Werk Richard Glimpel GmbH & Co. KG Fabrik für Präzisionswerkzeuge, Lauf (DE)

( * ) Notice: Subject to any disclaimer, the term of this patent is extended or adjusted under 35 U.S.C. 154(b) by 77 days.

(21) Appl. No.: 11/764,717

(22) Filed: Jun. 18, 2007

(65) Prior Publication Data

US 2007/0289150 A1 Dec. 20, 2007

(30) Foreign Application Priority Data

Jul. 19, 2006 (DE) .................. 10 2006 028 379

(51) Int. Cl.
*G01B 3/48* (2006.01)
*G01B 3/36* (2006.01)
(52) U.S. Cl. .................................... 33/199 R
(58) Field of Classification Search ............... 33/199 R
See application file for complete search history.

(56) References Cited

U.S. PATENT DOCUMENTS

| | | | | |
|---|---|---|---|---|
| 1,954,852 A | * | 4/1934 | Thomson | ............... 33/199 R |
| 4,417,402 A | * | 11/1983 | Hattan | ............... 33/199 R |
| 4,934,059 A | * | 6/1990 | Green | ............... 33/199 R |
| 5,170,306 A | * | 12/1992 | Gomes | ............... 33/199 R |
| 7,299,555 B2 | * | 11/2007 | Muradov et al. | ............... 33/199 R |
| 2006/0005374 A1 | * | 1/2006 | Glimpel | ............... 29/557 |

* cited by examiner

*Primary Examiner*—Christopher W Fulton
(74) *Attorney, Agent, or Firm*—Workman Nydegger

(57) ABSTRACT

A method for gaging a thread can include gaging at least one preliminary thread using a preliminary gage (e.g., a preliminary go gage, and/or a preliminary no go gage). The preliminary thread can be produced in a first step by removing material from the workpiece. The at least one preliminary thread has a preliminary thread profile, and the preliminary thread gage is adapted to the preliminary thread profile. In addition, the method can involve gaging a final thread using a final-thread gage (e.g., a preliminary final-thread go gage and/or a final-thread no-go gage). The final thread can be formed in a second step by plastic pressing-in of the material of the workpiece at least in a section of the preliminary thread profile using at least one thread-forming profile. The final thread has a final thread profile, and the final-thread gage can be adapted to the final thread profile.

19 Claims, 2 Drawing Sheets

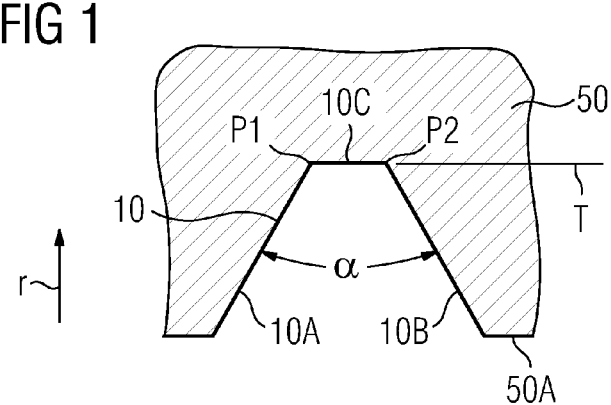
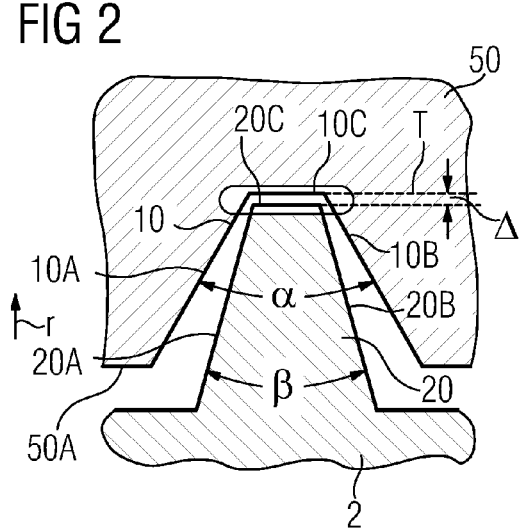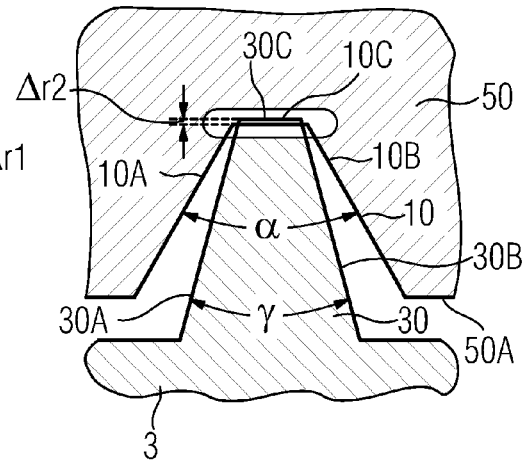
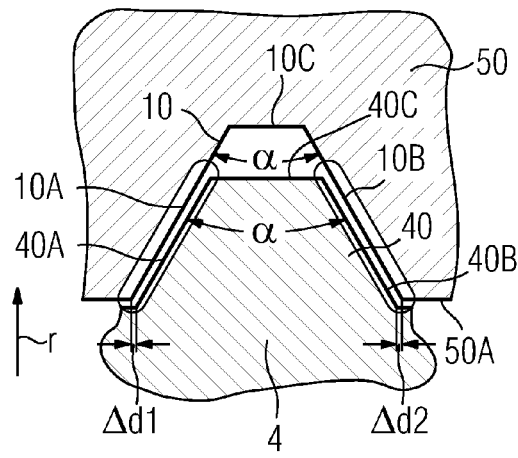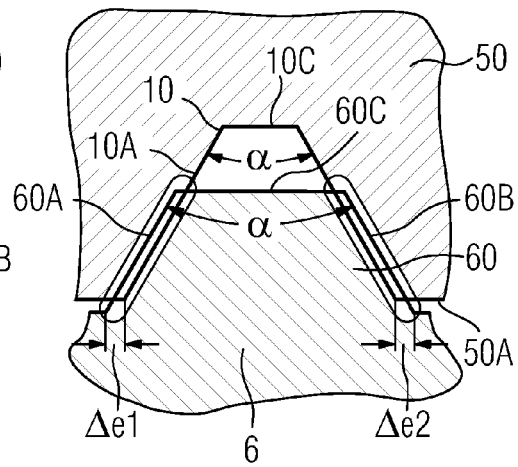

METHOD AND ARRANGEMENT FOR GAGING A THREAD PRODUCED IN AT LEAST TWO WORKING STEPS

CROSS-REFERENCE TO RELATED APPLICATIONS

The present invention claims the benefit of priority under 35 U.S.C. § 119 to German Patent Application No. 10 2006 028 379.1, filed on Jun. 19, 2006, having a translated title of "Method and Arrangement for Gaging a Thread Produced in at Least Two Working Steps," the entire contents of which are incorporated herein by reference.

BACKGROUND OF THE INVENTION

1. The Field of the Invention

The invention relates to a method and an arrangement for gaging (also referred to herein as "gauging") a thread produced in at least two working steps.

2. Background and Relevant Art

For thread production or thread rework, exclusively cutting, exclusively chipless and both cutting and chipless methods and threading tools are known.

Coming within the scope of cutting threading tools are taps (cf. Handbuch der Gewindetechnik und Frästechnik [Manual of threading practice and milling practice], publisher: EMUGE-FRANKEN, publishing firm: Publicis Corporate Publishing, year of publication: 2004 (ISBN 3-89578-232-7), designated below only as "EMUGE manual," chapter 8, pages 181 to 298) and thread milling cutters (cf. EMUGE manual, chapter 10, pages 325 to 372).

Coming within the scope of chipless thread tools are "thread formers" (cf. EMUGE manual, chapter 9, pages 299 to 324) and "circular thread formers" (cf. WO 02/094491 A1 or DE 103 18 203 A1). An advantage of the chipless thread production compared with the cutting thread production is that, due to the consolidation or compaction at the surface, the hardness of the material in the region of the thread profile increases and thus a more wear-resistant thread can be produced.

Finally, combined methods having at least two working steps for producing internal threads are known, in which, in a first working step, a preliminary thread is produced and, in a further working step, the internal thread is completed by forming from the preliminary thread. Due to this two- or multi-stage method, the entire volume of the thread profile does not have to be produced by a single forming tool by plastic deformation of the material, and the loading and the wear of the forming tool are reduced.

For such a combined method having a plurality of working steps, a separate tool can be used in a first variant in each working step. DE 10 2004 033 772 A1 discloses such a method, in which, in a first working step, a preliminary thread is initially produced in the workpiece with a cutting or chipless action by means of a tap, thread milling cutter, by turning, grinding or winding or also by means of a thread former and, in a second working step, the finish production of the preliminary thread is effected with a chipless action using a thread former or circular former, the forming wedges of which press into the thread root of the preliminary thread. The forming wedges are in this case centered by widened portions of their flanks in the initially produced thread.

The thread flanks of the preliminary thread produced in the first working step remain unchanged in the second working step, since the widened portions of the forming wedge flanks bear only against the preliminary thread flanks for centering, but do not deform the latter. In the second working step, the workpiece material is deformed further only in the region of the thread root, connecting the two thread flanks, of the preliminary thread. As a result, in the second working step, the entire thread root and also those regions of the thread flanks of the final thread which directly adjoin the thread root and lie in extension of the thread flanks of the preliminary thread are completed by forming and are thus additionally compacted and consolidated, whereas the predominant region of the thread flanks of the final thread have already been completely produced in the first working step and have not been worked further in the second working step.

In a second known variant of a combined method having a plurality of working steps, a combination tool having a cutting tapping part and a chipless thread-forming part, offset axially to the tool axis relative to the tapping part, on a tool shank is used, the tapping part, with rotation about the tool axis and with axial feed, cutting a preliminary thread in the workpiece in a first working step, and the following thread-forming part forming the preliminary thread in a predetermined manner in a second working step in order to produce the final thread. The tap therefore initially cuts the thread and the thread former subsequently partly forms the initially cut thread. Such an axial combination tool and method are known from DE 70 17 590 U and DE 196 49 190 C2.

According to DE 196 49 190 C2, the thread is first of all produced with a precise profile and accurately to size in the thread flanks by a cutting action by means of the tap of the combination tool and then only the thread root of this initially cut thread is compacted with a chipless action to a predetermined final diameter by the directly following thread former. As a result, in particular the first thread turns, following an initial thread cut, can be produced in such a way that they are more resistant to vibrations and are less susceptible to fracture. In the second working step, the two thread flanks cut by the tap in the first working step remain completely unchanged.

DE 70 17 590 U1 discloses a combination tool for producing internal threads, having a tapping drill, designed as a taper or second tap, as a front tool part for the initial cutting of the thread and a thread former, adjoining in the working direction, as a rear tool part for the finishing of the thread.

General terms and sizes and also parameters of threads and various thread types are standardized nationally and internationally, e.g., in DIN 2244, and are obtained from the EMUGE manual, chapter 15, pages 468 to 566.

The simple flank diameter of the internal thread is the diameter of the geometrically ideal circular cylinder, the generating lines of which intersect the thread in such a way that the sections in the thread gaps are equal to half the pitch. The axis of the circular cylinder is coaxial to the axis of the flank diameter.

The flank diameter of an external thread or internal thread is the diameter of a geometrically ideal circular cylinder, the generating lines of which intersect the thread Min such a way that the sections of the generating line which are formed by a thread gap and an adjacent thread tooth of the same are equally long. The axis of the circular cylinder is again coaxial to the axis of the flank diameter.

EMUGE manual, in chapter 12, pages 405 to 422, gives an overview of thread gages for gaging or testing threads.

A thread go plug gage and a thread no-go plug gage are used for gaging or testing an internal thread, in particular a nut internal thread.

The thread go plug gage tests the "pairing dimension" of the internal thread and the screw-in capacity. In this case, the smallest dimension of the internal thread flank diameter including certain errors of form in the thread, e.g., pitch deviations and thread profile angle deviations, and the smallest dimension of the outside diameter of the internal thread are tested. It is thus tested whether the straight thread flank piece is sufficiently long. The minor diameter of the internal thread is not tested. It must be possible to screw in the thread go plug gage manually over the entire length of the workpiece thread without applying special force.

The thread no-go plug gage tests whether the actual flank diameter of the internal thread exceeds the prescribed maximum size. The internal thread outside diameter and the internal thread minor diameter are not tested. The thread no-go plug gage may be screwed into the workpiece from both sides by not more than two revolutions without applying special force and therefore generally has a thread length of at least three thread turns. The thread profile generally has shortened thread flanks.

The thread limit plug gage is the combination of thread go plug gage and thread no-go plug gage on one handle.

The internal thread minor diameter is tested using a smooth, cylindrical go and no-go plug gage or limit plug gage. In principle, the internal thread minor diameter should be tested before gaging the internal thread flank diameter. The smooth go plug gage must be capable of being passed through the workpiece thread manually without applying special force. The thread on the gage plugs or gages is adapted to the thread to be measured, in particular to an ISO metric thread or a tapered thread or a self-locking thread.

The gaging or testing of produced threads is carried out at the end of the thread production or on finished threads.

BRIEF SUMMARY OF THE INVENTION

Implementations of the present invention specify a novel method and a novel arrangement for gaging (i.e., "gauging") a thread produced in at least two working steps. These implementations can be achieved according to the invention with regard to the method and features described herein, and recited in the claims.

For example, a method for gaging a thread produced in at least two working steps in a workpiece can include gaging at least one preliminary thread (or, intermediate thread), produced in at least one first working step (or, process step) by removing material from the workpiece (or, with a cutting action) and having a preliminary thread profile, by means of at least one preliminary thread gage (also referred to herein as "gauge") adapted to the preliminary thread profile; and gaging a final thread, re-formed in at least one second working step by plastic pressing-in (or, chipless forming) of the material of the workpiece at least in a section of the preliminary thread profile by means of at least one thread-forming profile and having a final thread profile, by means of at least one final-thread gage adapted to the final thread profile.

The arrangement for gaging a thread produced in at least two working steps in a workpiece can include: at least one preliminary thread gage for gaging a preliminary thread, produced in at least one first working step by removing material from the workpiece (or, with a cutting action) and having a preliminary thread profile, using a gage thread profile adapted to the preliminary thread profile; and at least one final thread gage for gaging a final thread, produced in at least one second working step by plastic pressing-in (or, chipless forming) of the material of the workpiece at least in a section of the preliminary thread profile by means of at least one thread-forming profile and having a final thread profile, using a gage thread profile adapted to the final thread profile.

According to implementations of the present the invention, therefore, not only is the final thread gaged (or "gauged"), but rather both the intermediate thread or preliminary thread and the final thread are gaged using special thread gages (or "gauges") adapted in their profile distribution in each case to the preliminary thread or the final thread. The separate gaging or testing of the initially produced preliminary thread and finish-produced final thread using associated thread gages according to the invention permits highly accurate production of a thread within close tolerance limits and with high process reliability. The thread gages used for testing the preliminary thread and the final thread are preferably in each case associated thread go gages and/or thread no-go gages and then if need be a thread limit plug gage.

Advantageous configurations and developments pursuant to the foregoing are further described herein.

The gaging of the preliminary thread and the final thread and the profiles of the thread gages used are as a rule selected as a result of the profile distribution between preliminary thread profile and final thread profile, that is to say in particular as a function of those profile regions of the preliminary thread profile which are formed into the final thread profile and those profile regions which remain unprocessed during the reforming, that is to say those profile regions which are also then exclusively produced with a cutting action in the final thread. This is because, in the case of the thread profile regions that are not re-formed, it is sufficient to gage these regions only at the preliminary thread. On the other hand, re-formed regions of the final thread are as a rule also gaged using the final thread gage in order to be able to verify the result of the reforming.

In the case of a preliminary thread profile having a preliminary thread root and preliminary thread flanks, the preliminary thread root and/or the preliminary thread flanks can be gaged for its (or their) form and/or dimension. Both the preliminary thread root and the preliminary thread flanks are preferably gaged, preferably using separate gages.

Also in the case of a final thread having a final thread profile with final thread root and final thread flanks, the final thread root and/or the final thread flanks can be gaged for its or their form and/or dimension.

Suitable in particular as preliminary thread gage(s) are in particular a thread go gage (or, thread go plug gage) and a thread no-go gage (or, thread no-go plug gage) or also a thread limit plug gage combining a go gage and a no-go gage. In the case of the final thread gage, at least one go gage and possibly also a no-go gage are used as a rule.

First of all, a preliminary thread is produced in the workpiece with a cutting action or by material removal in at least one first working step, and then, in at least one second working step, the preliminary thread is reworked without material removal, only by plastic pressing-in of a thread-forming tool and by the permanent deformation, effected as a result, of the workpiece material and is formed further into the final thread. In other words, during the plastic pressing-in for producing the final thread in the second working step, such a high pressure is exerted on the workpiece surface by means of the tool that, beyond purely elastic deformation, specific plastic forming of the workpiece material in the thread region is obtained, this plastic forming in turn leading to an increase in volume in the final thread profile relative to the preliminary thread profile.

The plastic pressing-in or forming consolidates the structure in the workpiece material at the relevant thread profile regions and as a rule also effects a flow of the workpiece material if the pressure exerted is above the yield point of the workpiece material. Both the consolidation processes and the flow processes lead on their own or in combination to the desired reduction in volume of the workpiece material and to the complementary increase in volume of the thread profile.

The pressing-in volume is in this case preferably established by adapting a thread-forming profile or an effective profile of the thread-forming tool to the preliminary thread profile produced beforehand and results in particular as a differential volume of the respective dimensions of preliminary thread profile and thread-forming profile less a possible and as a rule relatively small restoring volume on account of elastic restoring of the workpiece material.

A thread profile, whether the preliminary thread profile, the thread-forming profile or the final thread profile, is in this case defined in the conventional manner as a contour of a cross section of the thread turn perpendicularly to its spiral or helical course or as a contour of a longitudinal section through the thread turn in a sectional plane containing the thread center axis.

The final thread flanks of the final thread profile therefore extend, at least in sections, further into the workpiece material than the preliminary thread profile beforehand, or the final thread profile, at least in a section of the thread flanks, is larger than the preliminary thread profile by the volume displaced during the forming.

The preliminary thread profile and/or the thread-forming profile can be produced or constituted by a single profile or also by superimposition of a plurality of individual profiles as a resulting effective profile.

Furthermore, the production of the preliminary thread profile and the further forming of the preliminary thread profile into the final thread profile in the two working steps may be effected with different tools or also with a joint combination tool.

The tool(s) or the tool region(s) for producing the preliminary thread profile in the first working step may in particular comprise a tap and/or a thread milling cutter, and the tool(s) or the tool region or tool regions for finish forming the final thread in the second working step may comprise a thread-former and/or a circular thread-former.

In a method of producing a thread in a workpiece, with production of a preliminary thread having a preliminary thread profile in the workpiece in at least one first working step by removing material from the workpiece and production of a final thread having a final thread profile in at least one second working step by plastic reforming of the material of the workpiece at least in a section of the preliminary thread profile by means of at least one thread-forming region having a thread-forming profile, the process reliability can also be alternatively or additionally increased relative to the hitherto described solutions by virtue of the fact that insertion of the thread start of the thread-forming region at the thread start of the preliminary thread is ensured. This can be done by one or more of the following measures:

To insert the following thread-forming region into position, said thread-forming region may have an insertion region or an insertion thread having a profile adapted to the preliminary thread profile.

Smooth compensation for compression or minus programming with compensation for tension may be provided in the tool clamping means.

A defined thread start of the preliminary thread in the workpiece or exact insertion of the following thread-forming region at this thread start can be produced by determining the position (axial and rotary) of the tool(s).

Due to this combination of cutting or forming production steps, in particular:

1) threads can also be produced by forming in materials that flow poorly or are difficult to form, such as gray cast iron for example (partly or in final processing);
2) the process forces can be reduced;
3) threads having large thread pitches, in particular 6 mm, and/or large processing cross sections (in the final processing) can be produced by forming;
4) a "claw formation," despite the forming final processing, can be avoided or reduced and thus the nut core or the core diameter can be kept within close tolerances;
5) consolidation and increase in the fatigue strength and dynamic strength of the thread, at least of its finally formed thread regions, can be achieved; and
6) smoothing of thread surfaces, at least at the formed flank regions, can be achieved.

With the method and the tool(s) according to the invention, all common thread types, including metric threads (e.g., according to DIN or ISO), pipe threads, US UNIFIED threads, MJ threads, US UNJ threads, tapered threads, cylindrical threads, trapezoidal threads, round threads, buttress threads, WHITWORTH threads and also special threads such as recirculating ball screw threads or self-locking threads, can be produced and/or gaged in two or more stages.

The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 shows a cut preliminary thread profile;

FIG. 2 shows the external testing of the preliminary thread profile according to FIG. 1 by means of a preliminary thread root go gage;

FIG. 3 shows the external testing of the preliminary thread profile at the thread root according to FIG. 1 by means of a preliminary thread root no-go gage;

FIG. 4 shows the flank testing of the preliminary thread profile according to FIG. 1 by means of a preliminary thread flank go gage;

FIG. 5 shows the flank testing of the preliminary thread profile according to FIG. 1 by means of a preliminary thread flank no-go gage;

Figure 6:
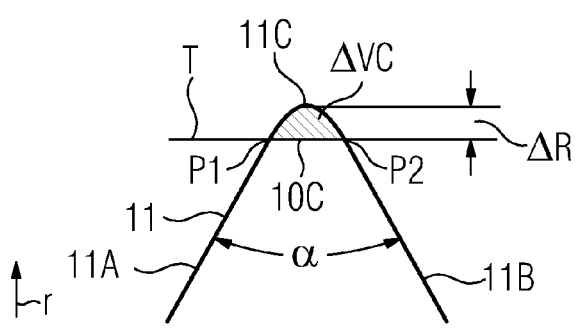
FIG. 6 shows a thread-forming profile for the chipless reforming of the cut preliminary thread profile according to FIG. 1.

Additional features and advantages of exemplary implementations of the invention will be set forth in the description which follows, and in part will be obvious from the description, or may be learned by the practice of such exemplary implementations.

DETAILED DESCRIPTION OF THE PREFERRED EMBODIMENTS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

The preliminary thread profile 10 according to FIGS. 1 to 5 is produced by cutting, in a first working step, an internal thread on a surface 50A of the workpiece 50, said surface 50A being the internal surface of a hole. The radius from a center axis (not shown) of the hole and of the thread is designated by r. In the embodiment shown, the preliminary thread profile 10 is of trapezoidal design with two straight preliminary thread flanks 11A and 11B, which enclose an angle $\alpha$ with one another, and a flat thread root 11C, which runs at the level of a separating line T which defines the transition points P1 and P2 between the preliminary thread flanks 11A and 11B and thread root 11C.

According to FIG. 2, the preliminary thread profile 10 produced is now tested or gaged by means of a preliminary thread root go gage 2 with regard to a minimum value or lower tolerance value of its outside diameter measured in the direction of the radius r. To this end, the preliminary thread root go gage 2 is screwed with a gage thread profile 20 into the preliminary thread having the preliminary thread profile 10. The gage thread profile 20 of the preliminary thread root go gage 2 has a gage thread root region 20C which likewise runs horizontally and rectilinearly like the preliminary thread root 10C, but projects radially outward in the direction r to a smaller extent than the desired specified radius or outside radius (or, outside diameter) of the preliminary thread root 10C by a predetermined difference $\Delta r1$.

The gage thread flanks 20A and 20B of the gage thread profile 20 are directed toward one another at an angle $\beta<\alpha$ and are therefore sufficiently far enough away from the associated preliminary thread flanks 10A and 10B. The preliminary thread root go gage 2 having a gage thread profile 20 must now be capable of being completely screwed into the preliminary thread having the preliminary thread profile 10 over its entire thread length, i.e., the gage thread root region 20C must not strike the preliminary thread root 10C when the preliminary thread root go gage 2 is being screwed in. Otherwise the thread root 10C of the preliminary thread profile 10 is at least partly not far enough outward in the radial direction and the preliminary thread produced must be reworked again or be cut deeper or is removed from the production process as scrap.

According to FIG. 3, the preliminary thread profile 10 produced is now tested or gaged using a preliminary thread root no-go gage 3 with regard to its maximum value or upper tolerance value of its outside diameter measured in the direction of the radius r. The gage thread profile 30 of the preliminary thread root no-go gage 3 has a gage thread root region 30C which likewise runs horizontally and rectilinearly like the preliminary thread root 10C but projects radially further outward in the direction r than the desired specified radius or outside radius (or, outside diameter) of the thread root 10C of the preliminary thread profile 10 by a predetermined difference $\Delta r2$.

The gage thread flanks 30A and 30B of the gage thread profile 30 are directed toward one another at an angle $\gamma<\alpha$ and are therefore sufficiently far enough away from the associated preliminary thread flanks 10A and 10B. The preliminary thread root no-go gage 3 having the gage thread profile 30 must now be completely incapable of being screwed into the preliminary thread having the preliminary thread profile 10, or must only be capable of being screwed into said preliminary thread at most by a certain angle of revolution of at most two revolutions. Otherwise the thread root 10C of the preliminary thread profile 10 is radially too far outward and the preliminary thread produced is cut too deep and is therefore removed from the production process as scrap.

Therefore only the region (ringed or encircled in FIGS. 2 and 3) of the preliminary thread root 10C is tested for its correct radial dimensions and possible deviations on account of production errors using the preliminary thread root go gage 2 and the preliminary thread root no-go gage 3.

According to FIG. 4, the preliminary thread profile 10 produced is tested or gaged with regard to its minimum admissible flank distance (or, flank diameter) using a preliminary thread flank go gage 4. The gage thread profile 40 of the preliminary thread flank go gage 4 has a gage thread root 40C which likewise runs horizontally and rectilinearly like the preliminary thread root 10C but projects radially outward in the direction r to a markedly smaller extent than the desired specified radius or outside radius (or, outside diameter) of the preliminary thread root 10C and is therefore sufficiently far enough away from the preliminary thread root 10C. The gage thread flanks 40A and 40B of the gage thread profile 40 of the preliminary thread flank go gage 4 are now directed toward one another at the same angle $\alpha$ as the preliminary thread flanks 10A and 10B and in each case run so as to be offset inward parallel to the latter at an axial distance of $\Delta d1$ and $\Delta d2$, respectively, i.e., measured in the direction of the thread axis, if the flank distance of the preliminary thread flanks 10A and 10B are at their specified distance.

The preliminary thread flank go gage 4 with its gage thread profile 40 must therefore be capable of being completely screwed into the preliminary thread having the preliminary thread profile 10 over its entire thread length, i.e., gage thread flanks 40A and 40B must not strike the associated preliminary thread flanks 10A and 10B when the preliminary thread flank go gage 2 is being screwed in. Otherwise the preliminary thread flanks 10A and 10B are at least partly not far enough away from one another in the axial direction and the preliminary thread produced must be reworked again or be cut wider or is removed from the production process as scrap.

According to FIG. 5, the preliminary thread profile 10 produced is now also tested or gaged with regard to its maximum admissible flank distance (or, flank diameter) using a preliminary thread flank no-go gage 10. The gage thread profile 60 of the preliminary thread flank no-go gage 6 has a gage thread root 60C which likewise runs horizontally and rectilinearly like the preliminary thread root 10C but projects radially outward in the direction r to a markedly smaller extent than the preliminary thread root 10C and is therefore sufficiently far enough away from the preliminary thread root 10C. The gage thread flanks 60A and 60B of the gage thread profile 60 of the preliminary thread flank no-go gage 6 are now directed toward one another at the same angle $\alpha$ as the preliminary thread flanks 10A and 10B and run laterally parallel to the latter or axially in each case further outward at an axial distance of Δe1 and Δe2, respectively, i.e., measured in the direction of the thread axis, if the flank distance of the preliminary thread flanks 10A and 10B is at its specified value.

The preliminary thread flank no-go gage 6 with the gage thread profile 60 must now be completely incapable of being screwed into the preliminary thread having the preliminary thread profile 10, or must only be capable of being screwed into said preliminary thread at most by a certain angle of revolution of at most two revolutions. Otherwise the flank distance of the preliminary thread flanks 10A and 10B of the preliminary thread profile 10 is too large and the preliminary thread produced is cut too wide and is therefore removed from the production process as scrap.

In FIG. 6, a thread-forming profile 11 for the forming rework of the preliminary thread profile 10 according to FIG. 1 is shown in a second working step superimposed on the preliminary thread profile 10. At the thread-forming profile 11, its linear flanks 11A and 11B intersect the separating line T, arranged at the same radius r as in FIG. 1, at the transition points P1 and P2, which lie within the flanks 11A and 11B. The flanks 11A and 11B of the thread-forming profile 11 are directed toward one another at the same angle α as the preliminary thread flanks 10A and 10B. The thread root region 11C of the thread-forming profile 11 is rounded and is arranged radially further outward, i.e., in the direction of the radius r, by a radial difference or a radial distance ΔR or has a correspondingly larger radial infeed into the workpiece 50 than the preliminary thread profile 10 or its preliminary thread root 10C. However, the thread root region 11C may also likewise run horizontally and/or linearly.

Figure 7:
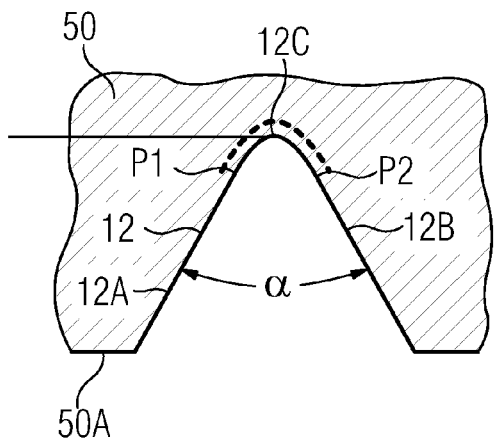
FIG. 7 shows the final thread profile resulting from the superimposition of the two profiles according to FIGS. 1 and 6.
Figure 8:
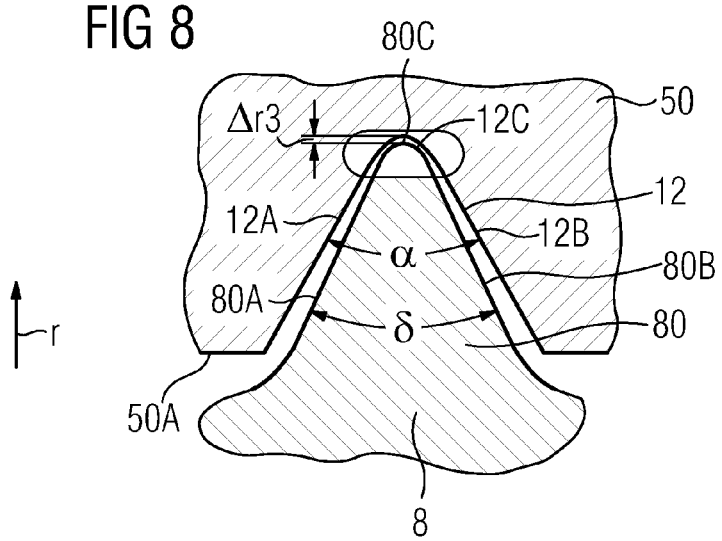
FIG. 8 shows the external testing of the final thread profile according to FIG. 7 at the thread root by means of a final thread root go gage.

The superimposition of the two profiles 10 and 11 according to FIG. 6 in the successive method or working steps, that is to say first of all cutting production of the preliminary thread profile 10 and after that forming rework of the preliminary thread profile 10 by the thread-forming profile 11, produces the final thread profile 12, which is shown in FIG. 7.

Due to cold working and flow of the material of the workpiece 50 and due to consolidation, the material of the workpiece 50 is pressed in by a pressing-in volume ΔVC on account of the radial distance ΔR of the preliminary thread root 10C and the thread root region 11C at the thread root of the preliminary thread. On the other hand, the material of the workpiece 50 is not shaped or formed further at the preliminary thread flanks 10A and 10B.

The final thread root 12C of the final thread profile is therefore produced by forming and corresponds in its shape to the thread root region 11C of the thread-forming profile 11, whereas the final thread flanks 12A and 12B are produced exclusively with a cutting action and correspond in shape to the preliminary thread flanks 10A and 10B.

The finished final thread profile 12 is now tested or gaged with regard to the minimum admissible outside radius of its re-formed final thread root 12C in a further testing or gaging step. To this end, a final-thread-root go gage 8 is used which has a gage thread profile 80 whose gage thread root region 80C is rounded and runs in parallel like or to the final thread root 13C, but projects radially outward in the direction r to a smaller extent than the desired specified radius or outside radius (or, outside diameter) of the final thread root 10C by a predetermined difference Δr3. The gage thread flanks 80A and 80B of the gage thread profile 20 are directed toward one another at an angle δ<α and are therefore sufficiently far enough away from the associated final thread flanks 12A and 12B.

The final thread root go gage 8 having a gage thread profile 80 must now be capable of being completely screwed into the final thread having the final thread profile 12 over its entire thread length, i.e., the gage thread root region 80C must not strike the final thread root 12C when the final thread root go gage 8 is being screwed in. Otherwise the final thread root 12C of the final thread profile 12 is at least partly not far enough outward in the radial direction and the final thread produced must be reworked again or be cut deeper or is removed from the production process as scrap.

The final thread and its final thread profile 12 can now also be gaged for a maximum admissible outside radius of the radial distance of the final thread 12C by means of a final-thread no-go gage in a similar manner to the preliminary thread according to FIG. 3 and/or also for flank distance of the final thread flanks 12A and 12B using a final thread flank go gage in a similar manner to the preliminary flank in FIG. 4 and/or using a final thread flank no-go gage in a similar manner to the preliminary flank in FIG. 5. The flank distance is gaged as a rule if, during the reforming of the preliminary thread using the thread-forming profile, the preliminary thread flanks are also additionally pressed in further, that is to say the final thread flanks are at a further distance apart than the preliminary thread flanks.

The preliminary thread profile is preferably produced by a tap or a thread milling cutter or also by a circular drill thread milling cutter. Following the cutting production of the preliminary thread, in a second working step the preliminary thread, for producing the final thread, is shaped further by a thread-forming tool provided with the thread-forming profile as effective profile, for example a thread former or a circular thread former. Alternatively, both working steps may also be carried out using a combination tool which has, offset axially from one another relative to the tool axis, a tapping region and/or a thread milling region as cutting region and a thread-forming region and/or a circular thread-forming region as forming region, which engage in the workpiece one after the other.

The curved thread root regions are preferably curved convexly, in particular in a circular shape, or elliptically or parabolically in all the embodiments with respect to the interior space or the thread turn.

The thread-forming profile is obtained in all the embodiments as an effective profile or superimposed profile of a thread-forming process or of one or more thread-forming tools and, in a thread-forming tool having a plurality of pressing lobes or forming teeth, corresponds to the superimposition of all the individual profiles of the individual pressing lobes or forming teeth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF DESIGNATIONS

10 Preliminary thread profile
10A, 10B Preliminary thread flank
10C Preliminary thread root
11 Thread-forming profile
11A, 11B Flank
11C Thread root region
12 Final thread profile 12A, 12B Flank
12C Thread root
P1, P2 Transition points
r Radius
T Separating line
α Angle
ΔR Radial distance
ΔVC Pressing-in volume

We claim:

1. A method for gauging a thread produced in at least two working steps in a workpiece, comprising the following method steps:
   a) gauging at least one preliminary thread, produced in at least one first working step by removing material from the workpiece and having a preliminary thread profile, by means of at least one preliminary thread gauge adapted to the preliminary thread profile,
   b) gauging a final thread, reformed in at least one second working step by plastic pressing-in of the material of the workpiece at least in a section of the preliminary thread profile by means of at least one thread-forming profile and having a final thread profile, by means of at least one final-thread gauge adapted to the final thread profile.

2. The method as claimed in claim 1, wherein the final thread is gauged for at least one admissible dimension by means of the at least one final thread gauge only in a section of the final thread profile that is reformed in the at least one second working step and is not gauged in a section of the final thread profile that is not reformed in the at least one second working step.

3. The method as claimed in claim 1, wherein the preliminary thread is gauged in the region of a preliminary thread root of the preliminary thread profile using at least one preliminary thread gauge,
   and/or
   wherein the preliminary thread is gauged for a minimum admissible radial dimension of the preliminary thread root of the preliminary thread profile using at least one preliminary thread gauge,
   and/or
   wherein the preliminary thread is gauged for a maximum admissible dimension of the preliminary thread root of the preliminary thread profile using at least one preliminary thread gauge.

4. The method as claimed in claim 3, wherein, at least one of:
   the at least one preliminary thread gauge used to gauge the preliminary thread for a minimum admissible radial dimension comprises a preliminary thread root go gauge; or
   the at least one preliminary thread gauge used to gauge the preliminary thread for a maximum admissible dimension comprises a preliminary thread root no-go gauge.

5. The method as claimed in claim 1, wherein the preliminary thread is gauged in the region of preliminary thread flanks of the preliminary thread profile using at least one preliminary thread gauge,
   and/or
   wherein the preliminary thread is gauged for a minimum admissible distance of the preliminary thread flanks of the preliminary thread profile using a preliminary thread gauge.

6. The method as claimed in claim 5, wherein the preliminary thread gauge used to gauge a minimum admissible distance comprises a preliminary thread flank go gauge.

7. The method as claimed in claim 1, wherein the preliminary thread is gauged for a maximum admissible distance of the preliminary thread flanks of the preliminary thread profile using at least one preliminary thread gauge.

8. The method as claimed in claim 7, wherein the at least one preliminary thread gauge used to gauge for a maximum admissible distance comprises a preliminary thread flank no-go gauge.

9. The method as claimed in claim 1, wherein the final thread is gauged in the region of the final thread root of the final thread profile using at least one final thread gauge.

10. The method as claimed in claim 9, wherein the final thread is gauged for a minimum admissible radial dimension of the final thread root of the final thread profile using at least one final thread gauge.

11. The method as claimed in claim 10, wherein the preliminary thread gauge used to gauge the final thread for a minimum admissible radial dimension comprises a preliminary thread flank no-go gauge.

12. The method as claimed in claim 9, wherein the final thread is gauged for a maximum admissible radial dimension of the final thread root of the final thread profile using at least one final thread gauge.

13. The method as claimed in claim 1, wherein the final thread is gauged in the region of final thread flanks of the final thread profile using at least one final thread gauge.

14. The method as claimed in claim 9, wherein the final thread is gauged for a minimum admissible distance of the final thread flanks of the final thread profile using at least one final thread gauge,
   and/or
   wherein the final thread is gauged for a maximum admissible distance of the final thread flanks of the final thread profile using at least one final thread gauge.

15. The method as claimed in claim 1, wherein the at least one preliminary thread gauge used to gage the at least one preliminary thread comprises at least one of:
   a preliminary thread go gauge; or
   a preliminary thread no-go gauge.

16. The method as claimed in claim 1, wherein the at least one final-thread gauge used to gauge the final thread comprises at least one of:
   a final thread go gauge; or
   a final thread no-go gauge.

17. A method of producing a thread in a workpiece, comprising the following method steps:
   a) producing a preliminary thread having a preliminary thread profile in the workpiece in at least one first working step by removing material from the workpiece,
   b) gauging the preliminary thread by means of at least one preliminary thread gauge adapted to the preliminary thread profile,
   c) producing a final thread having a final thread profile in at least one second working step by plastic reforming of the material of the workpiece at least in a section of the preliminary thread profile by means of at least one thread-forming profile,
   d) gauging the reformed final thread having a final thread profile by means of at least one final thread gauge adapted to the final thread profile.

18. The method as claimed in claim 17, wherein the final thread is gauged for at least one admissible dimension by means of the at least one final thread gauge only in a section of the final thread profile that is reformed in the at least one second working step and is not gauged in a section of the final thread profile that is not reformed in the at least one second working step.

19. A method of producing a thread in a workpiece, in particular the method according to claim 17, comprising the following method steps:
   a) producing a preliminary thread having a preliminary thread profile in the workpiece in at least one first step by removing material from the workpiece,
   b) producing a final thread having a final thread profile in at least one second working step by plastic reforming of the material of the workpiece at least in a section of the preliminary thread profile by means of at least one thread-forming region having a thread-forming profile,
   c) the thread-forming region having an insertion thread with a profile which is adapted to the preliminary thread profile and has thread flanks at least partly bearing against one another for the insertion of the thread-forming region into the preliminary thread in an accurate position, and/or
   d) smooth compensation for compression or minus programming with compensation for tension being provided for helping to insert the thread-forming region into the preliminary thread in an accurate position, and/or
   e) the axial position and rotary position of at least one preliminary thread tool or preliminary thread tool region, provided for producing the preliminary thread, and at least one final thread tool or final thread tool region, provided for producing the final thread, being determined and as a result the final thread tool or the final thread tool region is inserted into the preliminary thread in a defined manner at the thread start of the preliminary thread in the workpiece, in particular by the axial positions of the respective tool and associated tool-clamping means and the relative rotary positions of tool to tool-clamping means being determined or taken into account in each case.

* * * * *

UNITED STATES PATENT AND TRADEMARK OFFICE
CERTIFICATE OF CORRECTION

PATENT NO. : 7,536,795 B2 Page 1 of 1
APPLICATION NO. : 11/764717
DATED : May 26, 2009
INVENTOR(S) : Glimpel et al.

It is certified that error appears in the above-identified patent and that said Letters Patent is hereby corrected as shown below:

Title Page
Item 30, Foreign Application Priority Data, change "Jul. 19, 2006" to -- Jun. 19, 2006 --

Signed and Sealed this

Sixteenth Day of March, 2010

David J. Kappos
*Director of the United States Patent and Trademark Office*